United States Patent
Takeda et al.

(10) Patent No.: US 7,245,811 B2
(45) Date of Patent: Jul. 17, 2007

(54) OPTICAL CONNECTOR READILY CAPABLE OF CONNECTING AN OPTICAL FIBER WITHOUT DAMAGING THE OPTICAL FIBER

(75) Inventors: Jun Takeda, Tokyo (JP); Yuichi Koreeda, Tokyo (JP); Akihiro Onogawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 275 days.

(21) Appl. No.: 10/996,257

(22) Filed: Nov. 23, 2004

(65) Prior Publication Data

US 2005/0117851 A1   Jun. 2, 2005

(30) Foreign Application Priority Data

Nov. 27, 2003   (JP) .............................. 2003-397946

(51) Int. Cl.
   *G02B 6/00*   (2006.01)
(52) U.S. Cl. .................. 385/137; 385/139; 385/52; 385/53; 385/65; 385/83; 385/70
(58) Field of Classification Search .................. 385/52, 385/53, 54, 55, 59, 65, 70, 73, 76, 114, 115, 385/120, 83, 134, 136, 137, 88, 135, 138, 385/139
   See application file for complete search history.

(56) References Cited

U.S. PATENT DOCUMENTS 4,900,118 A * 2/1990 Yanagawa et al. ............. 385/24
5,671,315 A * 9/1997 Tabuchi et al. ............. 385/137
6,866,426 B1* 3/2005 Steinberg et al. ............. 385/83
2003/0174998 A1* 9/2003 Shevchuk .................... 385/137

FOREIGN PATENT DOCUMENTS

| JP | 8-15567 A | 1/1996 | ............... 385/52 X |
| JP | 09-243838 A | 9/1997 | ............... 385/52 X |
| JP | 11-223732 A | 8/1999 | ............... 385/52 X |
| JP | 11-305150 A | 11/1999 | ............... 385/52 X |
| JP | 2002-048934 A | 2/2002 | ............... 385/52 X |

* cited by examiner

*Primary Examiner*—Brian M. Healy
(74) *Attorney, Agent, or Firm*—Frishauf, Holtz, Goodman & Chick, P.C.

(57) ABSTRACT

For connecting an optical fiber having a fiber axis and an axial end portion provided with a chamfered surface having a predetermined angle with respect to the fiber axis, the optical connector includes an aligning member and a holding plate. The aligning member has a principal surface and a side surface adjacent to the principal surface. The aligning member has a fiber-receiving groove for receiving the axial end portion of the optical fiber. The fiber-receiving groove extends along the principal surface in a predetermined direction and has end portions each opening on the side surface. The holding plate is faced to the principal surface and covers the fiber-receiving groove. The holding plate has a first slant surface beside one of end portions of the fiber-receiving groove. The first slant surface has an angle with respect to the principal surface. The first angle is determined smaller than the predetermined angle.

9 Claims, 9 Drawing Sheets

OPTICAL CONNECTOR READILY CAPABLE OF CONNECTING AN OPTICAL FIBER WITHOUT DAMAGING THE OPTICAL FIBER

This application claims priority to prior Japanese application JP 2003-397946, the disclosure of which is incorporated herein by reference.

BACKGROUND OF THE INVENTION

This invention relates to an optical connector for use in connecting an optical fiber.

An optical fiber of the type is disclosed, for example, in Japanese Patent Application Publication (JP-A) No. H8-15567. The optical fiber includes an aligning member having an aligning hole as a through hole for aligning an optical fiber or fibers. In order to connect a pair of optical fibers to each other, these optical fibers are inserted into the aligning hole from opposite ends thereof, respectively. When axial ends of the optical fibers are brought into contact with each other at an intermediate portion of the aligning hole, the optical fibers are optically connected to each other. In order to facilitate insertion of the optical fibers, the opposite ends of the aligning hole are provided with tapered portions, respectively.

It is also proposed to chamfer an edge portion of the axial end of the optical fiber (for example, see Japanese Patent Application Publication (JP-A) No. H11-223732).

However, since the optical fiber is very thin, it is difficult to carry out an inserting operation of inserting the optical fiber into the aligning hole of the aligning member. In addition, a clearance between an inner diameter of the aligning hole and an outer diameter of the optical fiber is very small, for example, 1 µm. This also makes it difficult to insert the optical fiber into the aligning hole. During the inserting operation, the optical fiber is often damaged. The optical fibers are optically connected to each other when the axial end faces thereof are brought into contact with each other. Therefore, it is not acceptable that the end faces of the optical fibers are damaged during the inserting operation.

SUMMARY OF THE INVENTION

It is therefore an object of the present invention to provide an optical connector capable of facilitating insertion of an optical fiber into an aligning hole and reducing the possibility that an end face of the optical fiber is damaged during insertion.

Other objects of the present invention will become clear as the description proceeds.

According to an aspect of the present invention, there is provided a combination of an optical fiber and an optical connector for connecting the optical fiber, the optical fiber having a fiber axis and an axial end portion provided with a chamfered surface having a predetermined angle with respect to the fiber axis, the optical connector comprising an aligning member having a principal surface and a side surface adjacent to the principal surface, the aligning member having a fiber-receiving groove for receiving the axial end portion of the optical fiber, the fiber-receiving groove extending along the principal surface in a predetermined direction and having end portions each opening on the side surface; and a holding plate faced to the principal surface and covering the fiber-receiving groove, the holding plate having a first slant surface beside one of end portions of the fiber-receiving groove, the first slant surface having a first angle with respect to the principal surface, the first angle being determined smaller than the predetermined angle.

According to another aspect of the present invention, there is provided an optical connector for use in connecting an optical fiber having a fiber axis and an axial end portion provided with a chamfered surface having a predetermined angle with respect to the fiber axis, the optical connector comprising: an aligning member having a principal surface and a side surface adjacent to the principal surface, the aligning member having a fiber-receiving groove for receiving the axial end portion of the optical fiber, the fiber-receiving groove extending along the principal surface in a predetermined direction and having end portions each opening on the side surface; and a holding plate faced to the principal surface and covering the fiber-receiving groove, the holding plate having a first slant surface beside one of end portions of the fiber-receiving groove, the first slant surface having a first angle with respect to the principal surface, the first angle being determined smaller than the predetermined angle.

According to still another aspect of the present invention, there is provided an optical connector for use in connecting a plurality of optical fibers each having a fiber axis and an axial end portion provided with a chamfered surface having a predetermined angle with respect to the fiber axis, the optical connector comprising: an aligning member having a principal surface and a side surface adjacent to the principal surface, the aligning member having a plurality of fiber-receiving grooves each for receiving the axial end portion, each of the fiber-receiving grooves extending along the principal surface in a predetermined direction and having end portions each opening on the side surface; and a holding plate faced to the principal surface and covering the fiber-receiving groove, the holding plate having a first slant surface beside one of the end portions of the fiber-receiving grooves, the first slant surface having a first angle with respect to the principal surface, the first angle being determined smaller than the predetermined angle.

According to yet another aspect of the present invention, there is provided an optical connector for use in connecting an optical fiber having a fiber axis and an axial end portion provided with a chamfered surface having a predetermined angle with respect to the fiber axis, the optical connector comprising a first plug, a second plug, and an adapter interposed between the first and the second plugs to each other, the adapter comprising: an aligning member having a principal surface and a side surface adjacent to the principal surface, the aligning member having a fiber-receiving groove for receiving the axial end portion of the optical fiber, the fiber-receiving groove extending along the principal surface in a predetermined direction and having end portions each opening on the side surface; and a holding plate faced to the principal surface and covering the fiber-receiving groove, the holding plate having a first slant surface beside one of end portions of the fiber-receiving groove, the first slant surface having a first angle with respect to the principal surface, the first angle being determined smaller than the predetermined angle.

DESCRIPTION OF THE PREFERRED EMBODIMENTS

Referring to FIGS. 1 through 4, description will be made about an optical connector according to a first embodiment of the present invention.

Figure 1:
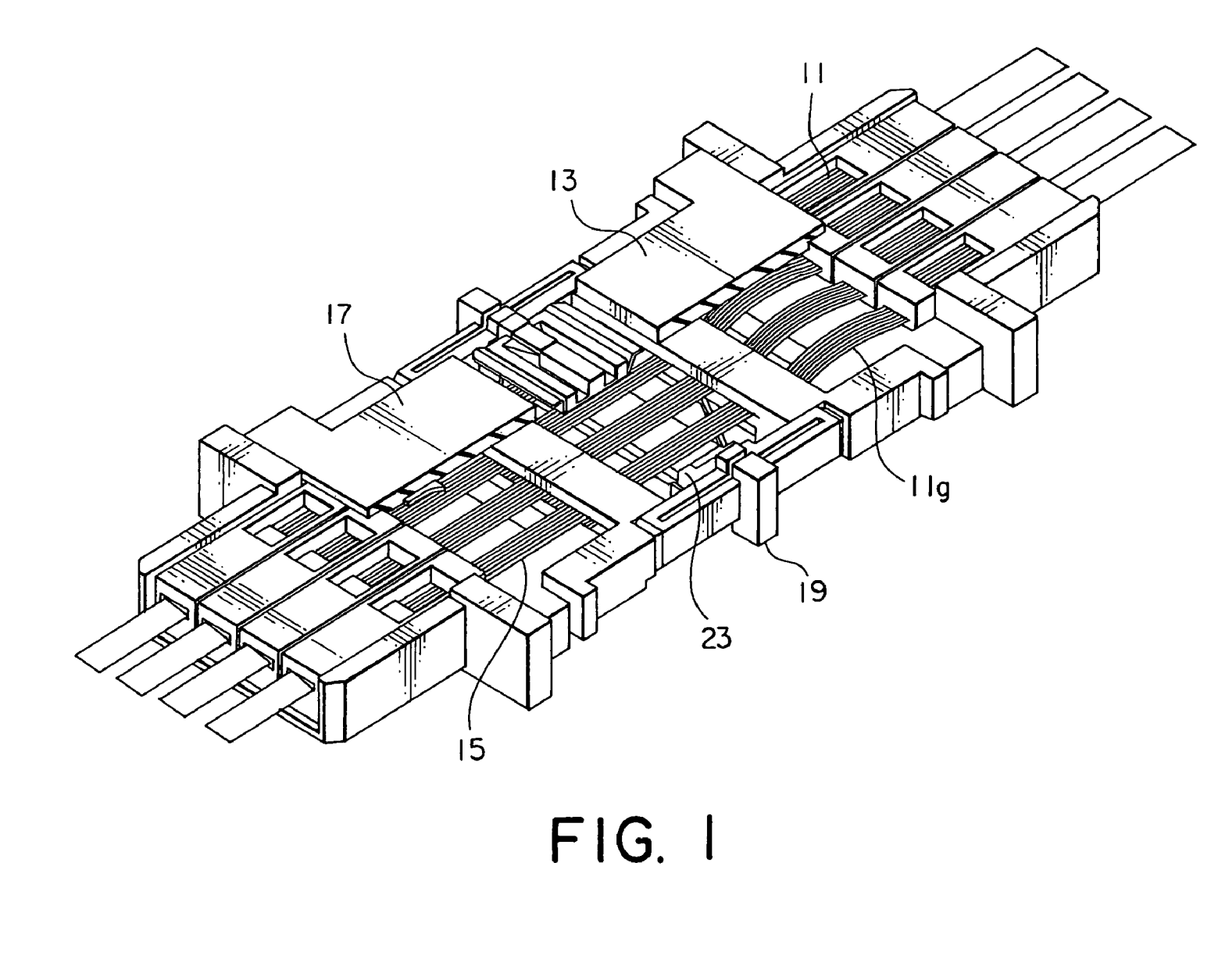
FIG. 1 is a perspective view of an optical connector according to a first embodiment of the present invention.

The optical connector illustrated in FIG. 1 comprises a first plug 13 holding a plurality of optical fibers 11, a second plug 17 holding a plurality of mating optical fibers 15 connected to the optical fibers 11, respectively, and an adapter 19 interposed between the first and the second plugs 13 and 17 to connect the first and the second plugs 13 and 17 to each other. Each of the optical fibers 11 and 15 has a fiber axis extending in an axial direction X of FIG. 2, and an axial end portion which will become clear as the description proceeds.

Each of the optical fibers 11 inserted into the first plug 13 and each corresponding one of the mating optical fibers 15 inserted into the second plug 17 are aligned inside the adapter 19 to extend in the axial direction X (see FIG. 2) with their end faces coaxially positioned or centered and brought into contact with each other. As a load required for contact between the end faces of the optical fiber 11 and the mating optical fiber 15, a restoring force of a bent portion 11g of the optical fiber 11 is used.

Figure 2:
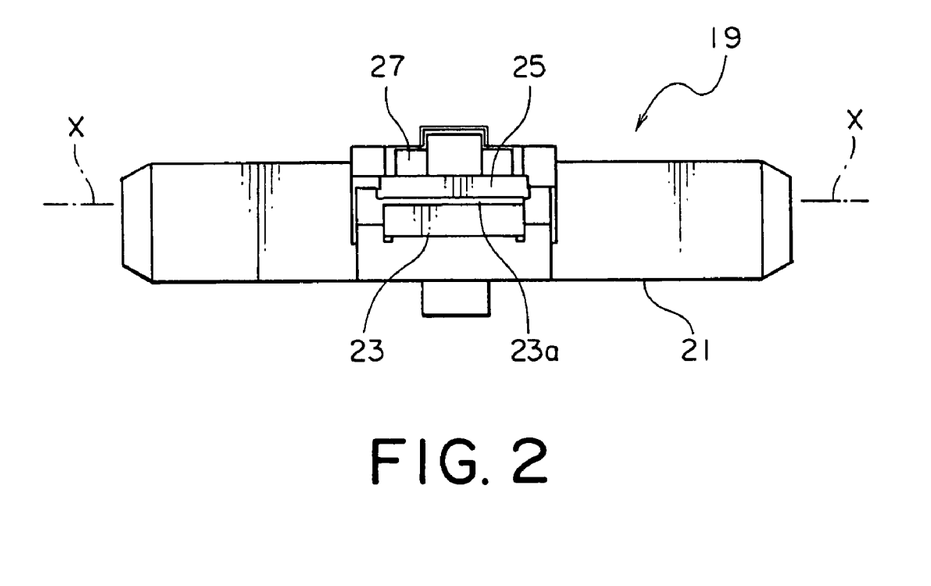
FIG. 2 is a side view of an adapter of the optical connector illustrated in FIG. 1.

As illustrated in FIG. 2, the adapter 19 comprises an adapter body 21, an aligning member 23 mounted to the adapter body 21, and a holding or pressing plate 25. The aligning member 23 and the holding plate 25 are preferably made of silicon. The aligning member 23 and the holding plate 25 are urged or biased by an elastic portion (not shown) formed on an adapter cover 27 disposed on the holding plate 25 and are brought into contact with each other.

Figure 3:
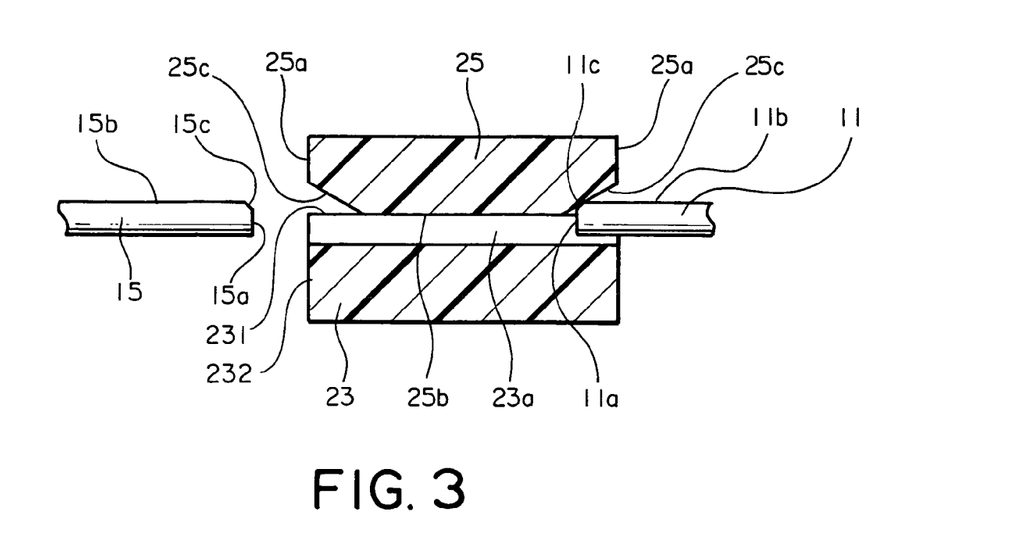
FIG. 3 is a side sectional view of a characteristic part of the adapter in FIG. 2 together with optical fibers.
Figure 4:
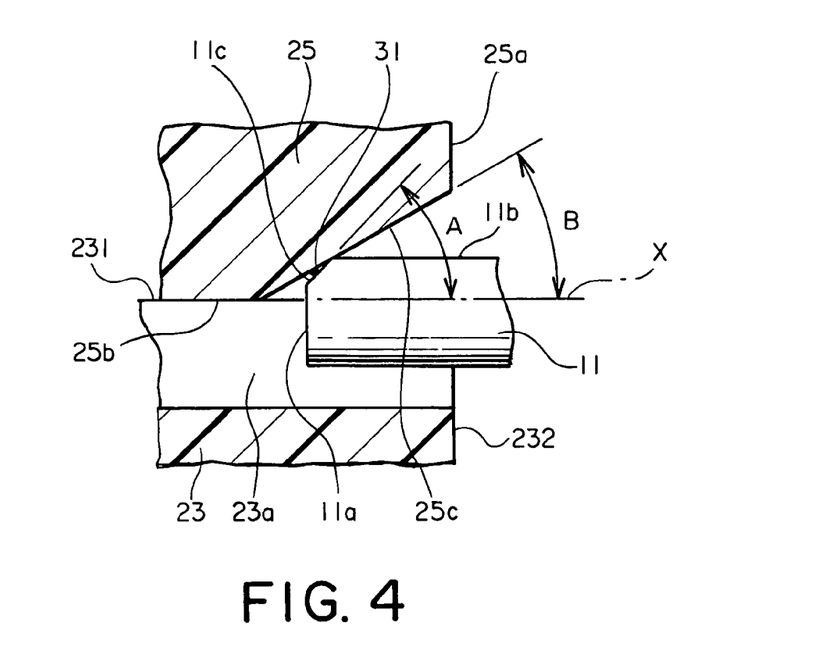
FIG. 4 is an enlarged view of a characteristic part in FIG. 3.

As illustrated in FIGS. 3 and 4, the aligning member 23 has a principal surface 231 and a side surface 232 adjacent to the principal surface 231. The aligning member 23 is provided with a plurality of fiber-receiving grooves 23a (see FIG. 15) for aligning the optical fibers 11 and the mating optical fibers 15 in the axial direction X. Each of the fiber-receiving grooves 23a has a V-shaped section but may have a U-shaped section. Each of the fiber-receiving grooves 23a extends along the principal surface 231 in a predetermined direction, namely, a left and right direction of FIG. 3 and has end portions each opening on the side surface 232. The holding plate 25 is superposed on the principal surface 231 of the aligning member 23 to face the fiber-receiving grooves 23a and serves to hold the optical fibers 11 and the mating optical fibers 15. In this relation, the aligning member 23 and the holding plate 25 are substantially flush with each other in the predetermined direction.

Each of the optical fibers 11 and each corresponding one of the mating optical fibers 15 are inserted between the aligning member 23 and the holding plate 25 and aligned by each of the fiber-receiving groove 23a to extend in the axial direction X. In this state, fiber end faces 11a and 15a of the optical fiber 11 and the mating optical fiber 15 are brought into contact with each other. Thus, the optical fiber 11 and the mating optical fiber 15 are coaxially positioned and optically connected to each other.

The holding plate 25 has a pair of insert-end faces 25a, a holding surface 25b faced to the aligning member 23, and a pair of slant surfaces 25c positioned beside the end portions of the fiber-receiving groove 23a for guiding insertion of the optical fibers 11 and 15. Each of the slant surfaces 25c is inclined to the insert-end faces 25a towards the holding surface 25b. In the other words, each of the slant surfaces 25c has an angle with respect to the principal surface 231 of the aligning member 23. One of the slant surfaces 25c is referred to as a first slant surface, another of the slant surfaces 25c being referred to as a second slant surface.

Each of the optical fibers 11 has a fiber end face 11a to be faced to the slant surface 25c upon insertion between the aligning member 23 and the holding plate 25, an outer peripheral surface 11b, and a chamfered surface 11c inclined to the fiber end face 11a and the outer peripheral surface 11b. Similarly, each of the mating optical fibers 15 has a fiber end face 15a to be faced to the slant surface 25c upon insertion between the aligning member 23 and the holding plate 25, an outer peripheral surface 15b, and a chamfered surface 15c inclined to the fiber end face 15a and the outer peripheral surface 15b. Each of the chamfered surfaces 11c and 15c may be formed only at a part to be faced to each of the slant surfaces 25c upon insertion.

Each of the chamfered surfaces 11c and 15c has a predetermined angle A with reference to the fiber axis that is set parallel substantially to the holding surface 25b when the optical fibers 11 is inserted in the fiber-receiving grooves 23a. On the other hand, each of the slant surfaces 25c has an inclination angle B with respect to the holding surface 25b and the principal surface 231. In the slant surfaces 25c, the inclination angle B will be referred to as a first angle and a second angle which are determined equal substantially to each other.

The predetermined angle A is greater than the inclination angle B. Namely, the inclination angle B is determined smaller than the predetermined angle A. With this structure, even if a foreign matter 31 is adhered to each of the slant surfaces 25c of the holding plate 25, the foreign matter 31 never migrates to the fiber end face 11a or 15a during insertion so that the contact between the fiber end faces 11a and 15a are not inhibited.

Figure 5:
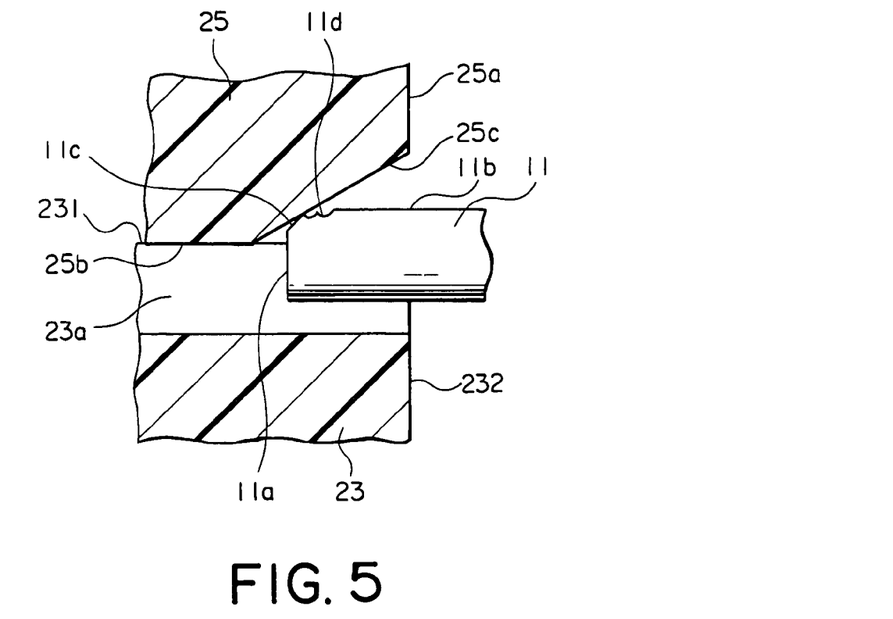
FIG. 5 is a view similar to FIG. 4 upon occurrence of a crack in the optical fiber.

During insertion, a terminal end of the chamfered surface 11c of the optical fiber 11 is contacted with the slant surface 25c of the holding plate 25. Therefore, even if a very small crack 11d occurs as illustrated in FIG. 5, the crack 11d is formed in an outer peripheral portion of the optical fiber 11 so that optical connection between the optical fiber 11 and the mating optical fiber 15 is not impaired.

Figure 6:
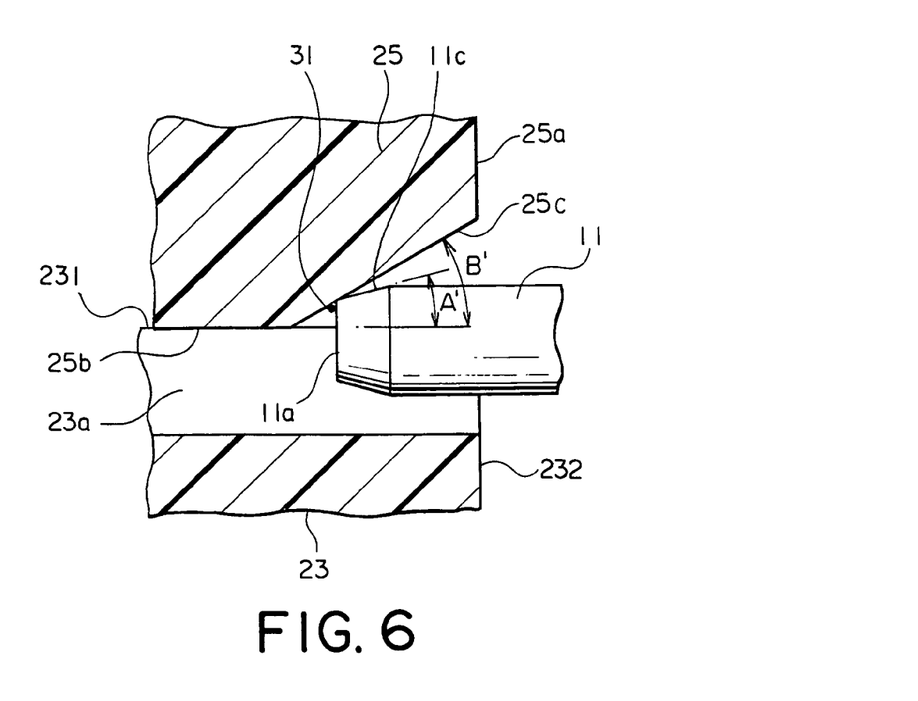
FIG. 6 is a view similar to FIG. 4 but showing an unfavorable example.
Figure 7:
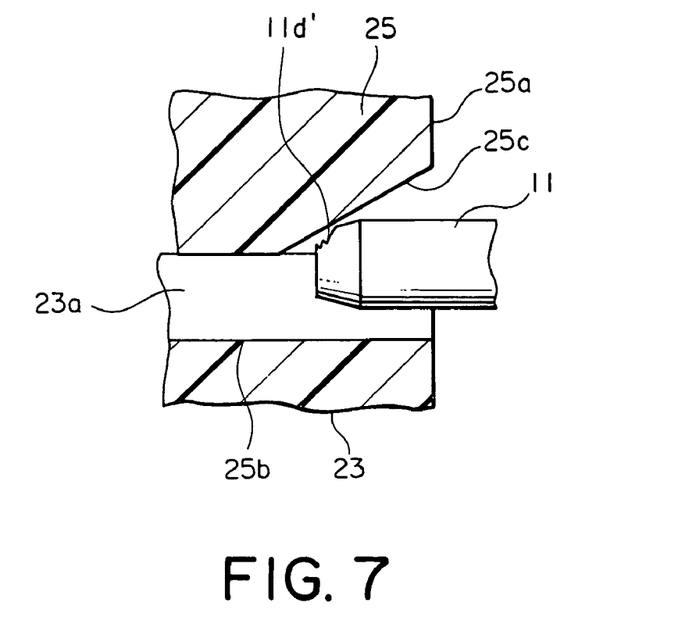
FIG. 7 is a view similar to FIG. 6 upon occurrence of a crack in the optical fiber.

Referring to FIG. 6, an predetermined angle A' of the chamfered surface 11c with reference to the holding surface 25b is smaller than an inclination angle B' of the slant surface 25c with reference to the holding surface 25b. In this case, a corner at an intersection between the fiber end face 11a and the chamfered surface 11c of the optical fiber 11 collides with the slant surface 25c so that a crack 11 d' may occur on the fiber end face 11a, as illustrated in FIG. 7.

Figure 8:
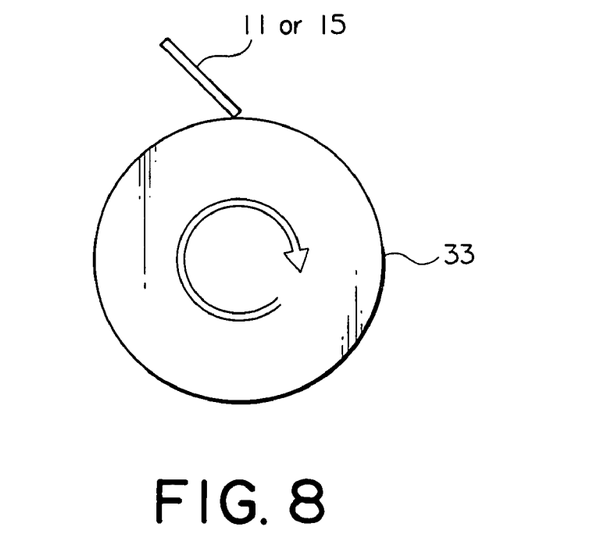
FIG. 8 is a side view for describing a method of forming a chamfered portion of the optical fiber.

Referring to FIG. 8, description will be made of a method of forming the chamfered surface 11c (or 15c) of the optical fiber 11 (or the mating optical fiber 15). In order to form the chamfered surface 11c (or 15c) of the optical fiber 11 (or the mating optical fiber 15), a part of the fiber end face 11a of the optical fiber 11 (or the fiber end face 15a of the mating optical fiber 15) is butted against a grinding surface of a grind stone 33 which is rotating. Thus, the chamfered surfaces 11c or 15c is formed.

Figure 9:
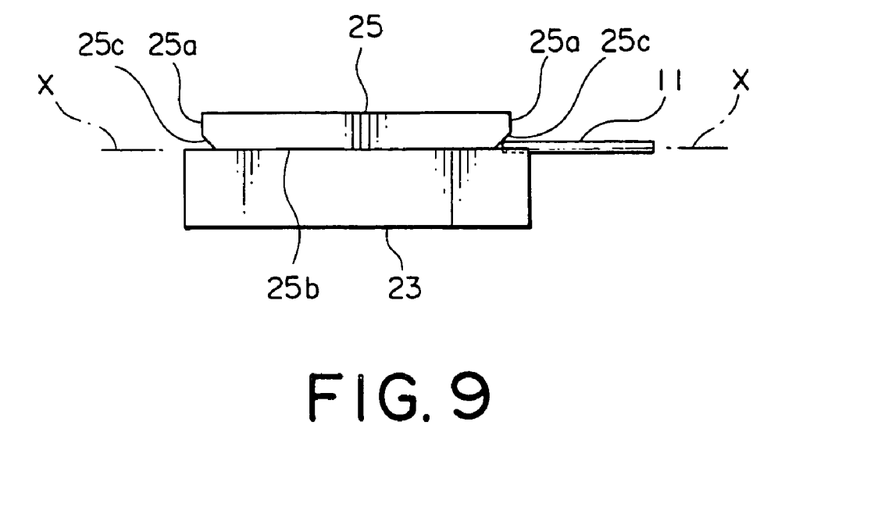
FIG. 9 is a side view of an adapter of a connector according to a second embodiment of the present invention together with an optical fiber.
Figure 10:
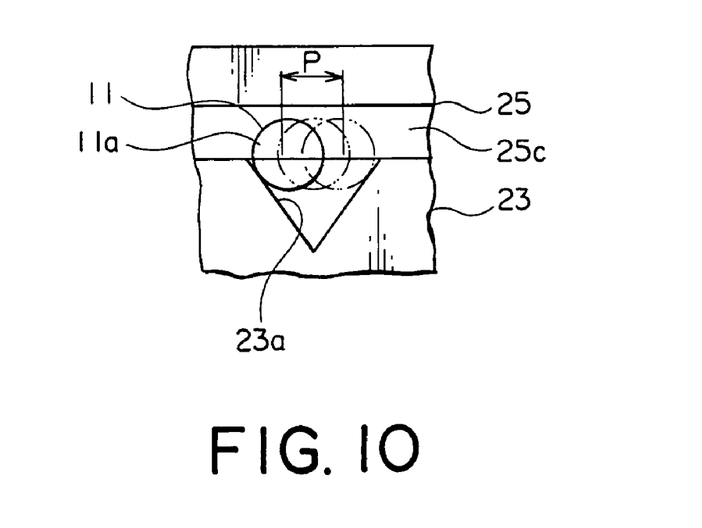
FIG. 10 is a front view of the adapter in FIG. 9 for describing a pitch allowance of the optical fiber in FIG. 9 with respect to a groove.

Referring to FIGS. 9 and 10, the description will be made about an optical connector according to a second embodiment of the present invention. Similar parts are designated by like reference numerals and description thereof will be omitted.

In FIGS. 9 and 10, the fiber end face 11a is butted against the slant surface 25c of the holding plate 25. The aligning member 23 extends outward from the insert-end face 25a in the axial direction X. The optical fiber 11 is positioned at an upper portion of the fiber-receiving groove 23a before the optical fiber is guided along the slant surface 25c of the holding plate 25 and reaches a position where the fiber end face 11a of the optical fiber 11 and the aligning member 23 are coincident in height with each other.

The optical fiber 11 is offset upward with respect to the fiber-receiving groove 23a of the aligning member 23. Therefore, the optical fiber 11 is guided along the slant surface 25c of the holding plate 25 to be inserted into the fiber-receiving groove 23a of the aligning member 23. In this case, the width of the upper portion of the fiber-receiving groove 23a is greater than an outer diameter of the optical fiber 11, for example, by about 50 µm. Therefore, the fiber end face 11a need not be chamfered. Therefore, as illustrated in FIG. 10, a pitch error P can be allowed even if the fiber end face 11a is not chamfered.

Figure 11:
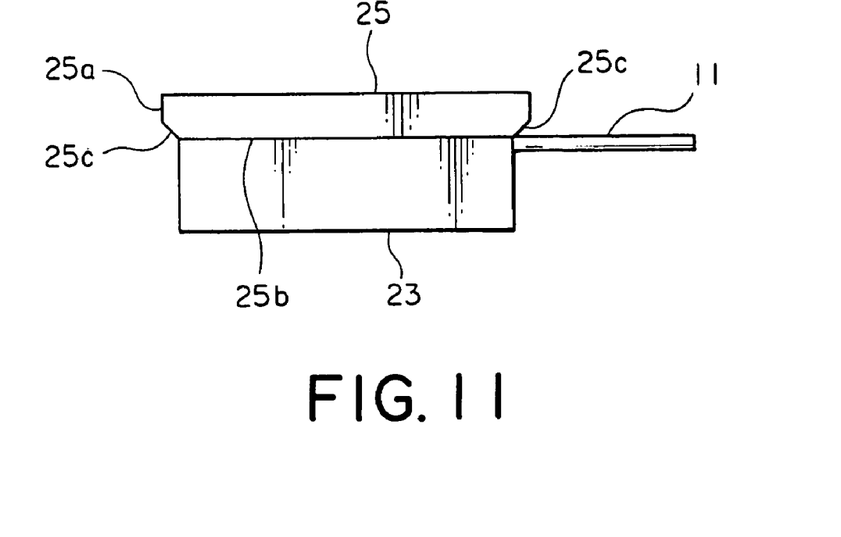
FIG. 11 is a side view of an adapter of a connector according to a third embodiment of the present invention together with an optical fiber.
Figure 12:
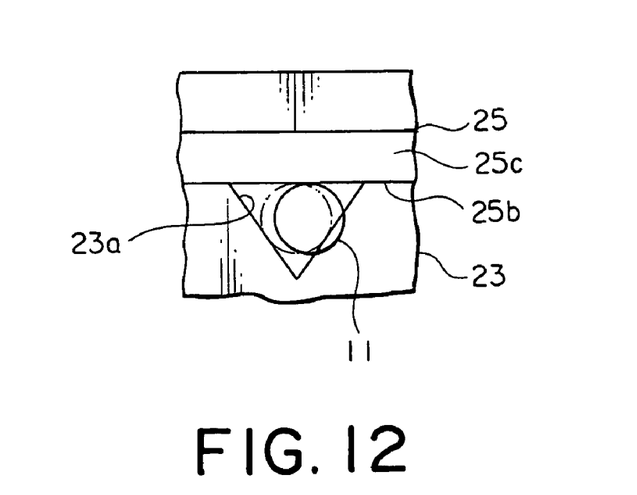
FIG. 12 is a front view of the adapter in FIG. 11 for describing a pitch allowance of the optical fiber in FIG. 11 with respect to a groove.

Referring to FIGS. 11 and 12, the description will be made about an optical connector according to a third embodiment of the present invention. Similar parts are designated by like reference numerals and description thereof will be omitted.

As illustrated in FIGS. 11 and 12, the slant surface 25c of the holding plate 25 may protrude outward from the aligning member 23 in the axial direction X. It is a matter of course that the fiber end face 11a of the optical fiber 11 is not provided with the chamfered surface 11c. In this case, if the fiber end face 11a of the optical fiber 11 is not provided with the chamfered surface 11c, the pitch error P can not be allowed so that the fiber end face 11a may be damaged in contact with the aligning member 23.

Figure 13:
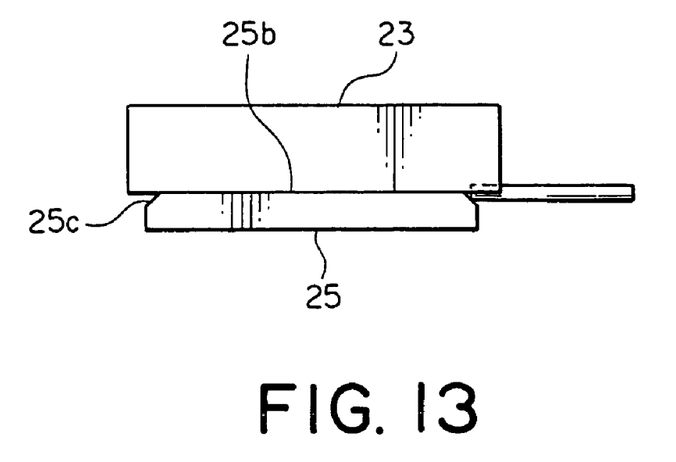
FIG. 13 is a side view showing the adapter of the optical connector in FIG. 9 in a vertically inverted position.
Figure 14:
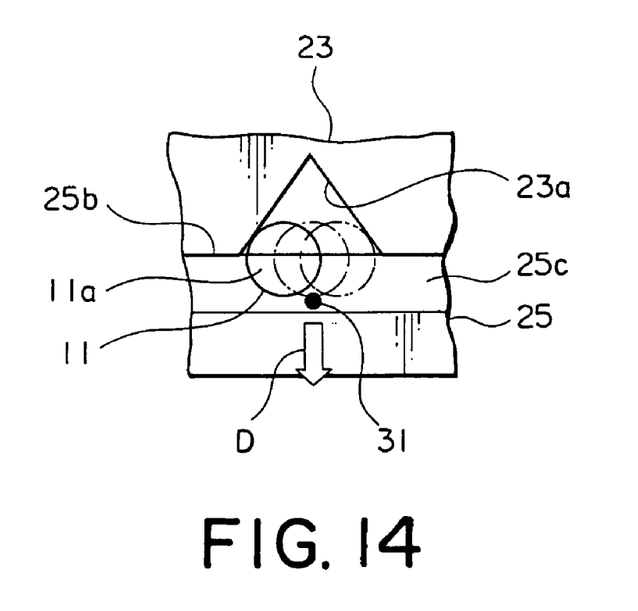
FIG. 14 is a front view of the adapter in FIG. 13 for describing fall of a foreign matter.

Referring to FIGS. 13 and 14, the holding plate 25 and the aligning member 23 illustrated in FIGS. 9 and 10 are inverted in position in a vertical direction. In this case, when the optical fiber 11 is inserted between the aligning member 23 and the holding plate 25, the foreign matter 31 adhered to the slant surface of the holding plate 25 does not fall into the fiber-receiving groove 23a but falls downward along the holding plate 25 in a direction depicted by an arrow D in FIG. 14) It is therefore possible to prevent the foreign matter 31 from being trapped in the aligning member 23.

Figure 15:
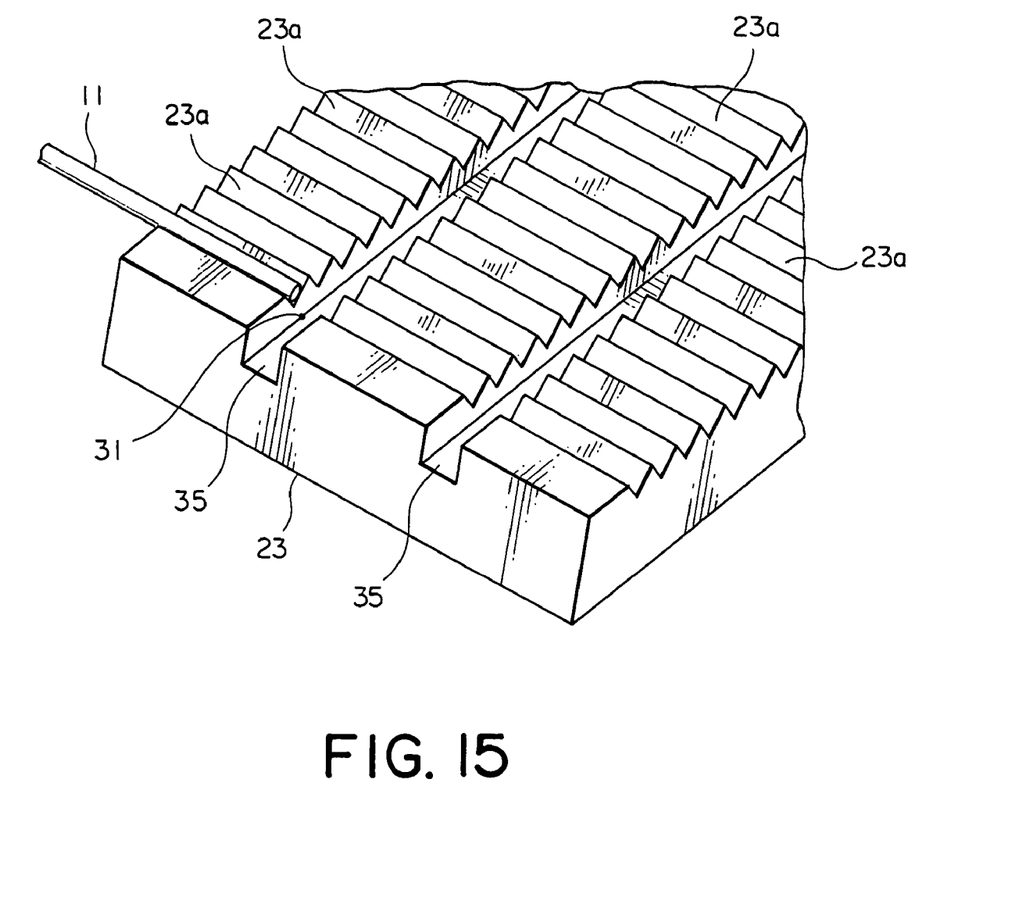
FIG. 15 is an enlarged perspective view of a characteristic part of a modification of an aligning member illustrated in FIG. 9.

Referring to FIG. 15, a part of the aligning member 23 is shown. The aligning member 23 is provided with a plurality of intersecting grooves 35 extending in a direction intersecting the fiber-receiving grooves 23a of the aligning member 23 to allow the foreign matter 31 to fall down thereinto. For example, even if the foreign matter 31 is pushed into the fiber-receiving groove 23a during insertion of the optical fiber 11, the foreign matter 31 falls down into the intersecting groove 35. It is therefore possible to avoid optical performance from being deteriorated by presence of the foreign matter 31.

Each of the optical connectors described above is applicable in case where a waveguide circuit and an optical fiber are connected to each other.

In the structure illustrated in FIG. 15, the aligning member 23 is provided with the intersecting grooves 35. Alternatively, the holding plate 25 may be provided with foreign matter receiving grooves. Further alternatively, both of the aligning member 23 and the holding plate 25 may be provided with foreign matter receiving grooves.

Although the present invention has been shown and described in conjunction with a few preferred embodiments thereof, it should be understood by those skilled in the art that the present invention is not limited to the foregoing description but may be changed and modified in various other manners without departing from the spirit and scope of the present invention as set forth in the appended claims.

What is claimed is:

1. An optical connector for use in connecting an optical fiber having a fiber axis and an axial end portion including a chamfered surface having a predetermined angle with respect to the fiber axis, the optical connector comprising:
   a first plug;
   a second plug; and
   an adapter interposed between the first and the second plugs to connect the first and second plugs to each other, the adapter comprising:
   an aligning member, which has a principal surface and side surfaces adjacent to the principal surface, and which comprises a fiber-receiving groove for receiving the axial end portion of the optical fiber, the fiber-receiving groove extending along the principal surface in a predetermined direction and having end portions each opening at one of the side surfaces; and
   a holding plate which is faced to the principal surface and covers the fiber-receiving groove, and which comprises a first slant surface adjacent to a first one of the end portions of the fiber-receiving groove, the first slant surface having a first angle with respect to the principal surface, the first angle being smaller than the predetermined angle.

2. The optical connector according to claim 1, wherein the holding plate comprises a second slant surface adjacent to a second one of the end portions of the fiber-receiving groove, the second slant surface having a second angle with respect to the principal surface, the second angle being smaller than the predetermined angle.

3. The optical connector according to claim 2, wherein the second angle is substantially equal to the first angle.

4. The optical connector according to claim 2, wherein the aligning member and the holding plate are substantially flush with each other at respective ends thereof along the predetermined direction.

5. The optical connector according to claim 2, wherein the aligning member extends outward from the holding plate in the predetermined direction.

6. The optical connector according to claim 2, wherein the holding plate extends outward from the aligning member in the predetermined direction.

7. The optical connector according to claim 1, wherein the fiber-receiving groove has a V-shaped section.

8. The optical connector according to claim 1, wherein the aligning member further comprises at least one intersecting groove which is formed in the principal surface and which extends in a direction intersecting the fiber-receiving groove.

9. The optical connector according to claim 8, wherein the intersecting groove is greater in depth than the fiber-receiving groove.

* * * * *